United States Patent Office 2,872,372
Patented Feb. 3, 1959

2,872,372

NEW INDOLE DERIVATIVES

Roy Hull, Manchester, England, assignor to Imperial Chemical Industries Limited, Millbank, London, England, a corporation of Great Britain No Drawing. Application May 21, 1957
Serial No. 660,481

Claims priority, application Great Britain June 8, 1956

10 Claims. (Cl. 167—58)

This invention relates to new indole derivatives and more particularly it relates to certain 3-(5-nitro-2-furfurylidene)oxindole derivatives which possess useful therapeutic properties.

According to the invention we provide the said new indole derivatives which are compounds of the formula:

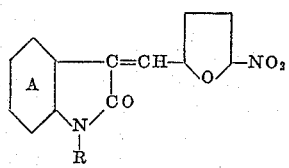

wherein R stands for hydrogen or for an acyl group and wherein the nucleus A may optionally bear substituents.

As suitable substituents in the nucleus A there may be mentioned for example halogen, nitro, acylamino, alkyl, hydroxy, alkoxy and carboxylic acid radicals.

As a particularly valuable compound there may be mentioned for example 3-(5-nitro-2-furfurylidene)-oxindole.

According to a further feature of the invention we provide a process for the manufacture of the said new indole derivatives which comprises interaction of an oxindole derivative of the formula:

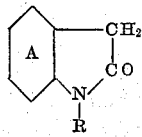

wherein A and R have the meaning stated above, with 5-nitro-2-furaldehyde or with a compound capable of action as 5-nitro-2-furaldehyde.

As compounds capable of reacting as 5-nitro-2-furaldehyde there may be mentioned for example 5-nitro-2-furaldehyde diacetate in the presence of aqueous mineral acid for example aqueous hydrochloric acid. The reaction may conveniently be brought about in a suitable solvent or diluent for example in acetic acid, in aqueous ethanol or in anhydrous formic acid. There may also optionally be present a basic catalyst for example sodium acetate.

As stated the new indole derivatives of the invention possess useful therapeutic properties. They are particularly useful as antibacterial agents especially for antiseptic purposes. They are active against a wide range of micro-organisms including Gram positive and Gram negative bacteria.

Thus according to a further feature of the invention we provide new antimicrobial compositions wherein the active ingredient is at least one of the new indole derivatives of the formula stated above.

As a particularly valuable ingredient there may be mentioned for example 3-(5-nitro-2-furfurylidene)-oxindole.

The said compositions may be in the form of solutions in polyethylene glycol which may optionally contain wetting agents for example condensation products of alkylphenols with ethylene oxide for example the condensation product of octylcresol with 8–10 molecular proportions of ethylene oxide. The compositions may also be in the form of aqueous dispersions wherein a suitable dispersing or surface active agent is polyoxyethylene sorbitan mono-oleate. Suitable aqueous dispersions may contain non-toxic ingredients known to be miscible with water for example glycerol, thickening or gelling agents for example ethyl cellulose and condensation products of fatty alcohols and ethylene oxide for example the waxy, unctuous product obtained from the condensation of cetyl or cetostearyl alcohol and 20–24 molecular proportions of ethylene oxide. The said compositions may also be in the form of oily solutions and a suitable oily solvent medium may be for example castor oil.

The antimicrobial compositions may also be in the form of creams, ointments and pastes and such formulations may contain any suitable non-toxic ingredients known to the art. Thus a suitable ointment base may be a mixture of polyethylene glycol 400 and polyethylene glycol 4000 and a suitable paste may comprise a thickening agent for example zinc oxide in admixture with an oily or fatty base for example castor oil and white beeswax optionally in the presence of a fatty alcohol for example cetyl alcohol or cetostearyl alcohol. Suitable cream bases may be formulated from oil-in-water type emulsions known to the art for example from castor oil and fatty alcohols for example cetyl alcohol or cetostearyl alcohol dispersed in water in the presence of condensation products of fatty alcohols with ethylene oxide for example the condensation product of cetyl or cetostearyl alcohol with 20–24 molecular proportions of ethylene oxide.

The antimicrobial compositions may also be in the form of suitable non-toxic dusting powders formulated from inert diluents or carriers for example talc and/or starch in the presence of additional ingredients for example zinc oxide or boric acid.

The said compositions as indicated above possess antibacterial properties and they may be used in the treatment of the skin in those circumstances where a preparation possessing antiseptic properties is required.

The invention is illustrated but not limited by the following examples in which the parts are by weight:

Example 1

1.41 parts of 5-nitro-2-furaldehyde, 1.33 parts of oxindole and 8.5 parts of acetic acid are heated together under reflux during 30 minutes. The mixture is cooled and added to 100 parts of water. It is then filtered and 3-(5-nitro-2-furfurylidene)-oxindole is obtained and washed with water. It is crystallised from β-ethoxyethanol and has M. P. 268° C. with decomposition.

Example 2

2.43 parts of 5-nitro-2-furaldehyde diacetate, 1.33 parts of oxindole and 1.06 parts of 35% aqueous hydrochloric acid are heated together under reflux in aqueous ethanol during one hour. The mixture is cooled and filtered and 3-(5-nitro-2-furfurylidene)-oxindole is obtained and washed with water. It is identical with the compound as described in Example 1.

Example 3

A solution of 0.37 part of sodium acetate in 5 parts of acetic acid is added to a solution of 1.33 parts of 5-nitro-2-furaldehyde and 2 parts of 5-bromo-oxindole (prepared by the method of Sumpter, Miller and Hendrick, Journal of the American Chemical Society, 1945, volume 67, page 1656) in 16 parts of acetic acid. The mixture is heated under reflux during 15 minutes, then cooled and filtered. There is obtained 5-bromo-3-(5-nitro-2-furfurylidene)-oxindole, which when crystallized from β-ethoxyethanol has M. P. 305° C. with decomposition.

Example 4

From 0.66 part of 5-nitro-2-furaldehyde, 0.8 part of 5-nitro-oxindole (prepared by the method of Sumpter, Miller, and Magan, Journal of the American Chemical Society, 1945, volume 67, page 499) and a solution of 0.185 part of sodium acetate in 5 parts of acetic acid by the procedure described in Example 3, there is obtained 5-nitro-3-(5-nitro-2-furfurylidene)-oxindole which does not melt below 320° C.

Example 5

A solution of 0.4 part of sodium acetate in 5 parts of acetic acid is added to a solution of 0.78 part of 5-nitro-2-furaldehyde and 0.95 part of 5-acetamido-oxindole (prepared by acetylation of 5-amino-oxindole), in 7.5 parts acetic acid. The mixture is heated at 100° C. during 3 hours then cooled and filtered. There is obtained 5-acetamido-3-(5-nitro-2-furfurylidene)-oxindole which when crystallised from 50% aqueous acetic acid has M. P. 301° C. with decomposition.

Example 6

A mixture of 2.3 parts of 5-benzamido-oxindole, 1.3 parts of 5-nitro-2-furaldehyde and 20 parts of acetic acid is heated under reflux during 2 hours and then cooled and filtered. There is obtained 5-benzamido-3-(5-nitro-2-furfurylidene)-oxindole, which when crystallised from dimethyl-formamide has M. P. 274-276° C. with decomposition.

The 5-benzamido-oxindole used as starting material may be obtained by shaking together 2.96 parts of 5-amino-oxindole and 1.85 parts of benzoyl chloride with 20 parts of 4% aqueous sodium hydroxide. The mixture is filtered and the solid residue is washed with hot water and there is thus obtained 5-benzamido-oxindole.

Example 7

The process as described in Example 6 is repeated replacing the 2.3 parts of 5-benzamido-oxindole by an equivalent proportion of 5-p-chlorobenzamido-oxindole. There is thus obtained, in a similar manner, 5-p-chlorobenzamido-3-(5-nitro-2-furfurylidene)-oxindole, M. P. 318-319° C., with decomposition.

The 5-p-chlorobenzamido-oxindole used as starting material may be obtained by interaction of 5-amino-oxindole and p-chlorobenzoyl chloride in the presence of aqueous sodium hydroxide according to the process described at the end of Example 6.

Example 8

A mixture of 2.75 parts of 5-propionamido-oxindole, 1.9 parts of 5-nitro-2-furaldehyde and 20 parts of acetic acid is heated under reflux during 2 hours and is then cooled and filtered. The solid residue thus obtained is 3-(5-nitro-2-furfurylidene)-5-propionamido-oxindole, which when crystallised from dimethylformamide has M. P. 308-310° C. with decomposition.

The 5-propionamido-oxindole used as starting material may be obtained by adding 5.55 parts of propionyl chloride to a suspension of 5.92 parts of 5-amino-oxindole in 100 parts of dioxan and 8.6 parts of diethylaniline. The mixture is heated under reflux during 10 minutes and then kept overnight at 18-23° C. and filtered. There is obtained 5-propionamido-oxindole, which when crystallised from water has M. P. 228-230° C.

Example 9

A mixture of 2.3 parts of 5-n-valeramido-oxindole, 1.41 parts of 5-nitro-2-furaldehyde and 20 parts of acetic acid is heated under reflux during 3 hours and is then cooled and filtered. The solid residue thus obtained is 3-(5-nitro-2-furfurylidene)-5-n-valeramido-oxindole, which when crystallised from acetic acid has M. P. 272-274° C. with decomposition.

The 5-n-valeramido-oxindole used as starting material may be obtained by allowing a mixture of 5.7 parts of 5-amino-oxindole, 6.8 parts of n-valeryl chloride and 50 parts of pyridine to stand overnight at 18-23° C. and then evaporating the mixture to dryness under reduced pressure. The residue is triturated with a little water and there remains 5-n-valeramido-oxindole, which when crystallised from water has M. P. 226-228° C.

Example 10

The process as described in Example 9 is repeated replacing the 5-n-valeramido-oxindole by an equivalent proportion of 5-n-butyramido-oxindole. There is thus obtained, in a similar manner, 5-n-butyramido-3-(5-nitro-2-furfurylidene)-oxindole, which when crystallised from dimethylformamide has M. P. 296-298° C. with decomposition.

The 5-n-butyramido-oxindole used as starting material may be obtained from 5-amino-oxindole and n-butyryl chloride. It has M. P. 236-238° C. after crystallisation from aqueous alcohol.

Example 11

A mixture of 0.8 part of 5-n-butyramido-oxindole in 10 parts of water and 0.5 part of 35% aqueous hydrochloric acid and 0.95 part of 5-nitro-2-furaldehyde diacetate in 10 parts of ethanol is heated under reflux during 2 hours. The mixture is then cooled and filtered and the solid residue is crystallised from acetic acid. The product thus obtained is identical with the compound as described in Example 10.

Example 12

The process as described in Example 9 is repeated replacing the 5-n-valeramido-oxindole by an equivalent proportion of 5-isobutyramido-oxindole. There is thus obtained, in a similar manner, 5-isobutyramido-3-(5-nitro-2-furfurylidene)-oxindole, which when crystallised from dimethylformamide has M. P. 314-316° C.

The 5-isobutyramido-oxindole used as starting material may be obtained by interaction of 5-amino-oxindole and isobutyryl chloride in pyridine. It has M. P. 271-272° C. after crystallisation from butanol.

Example 13

The process as described in Example 9 is repeated replacing the 5-n-valeramido-oxindole by an equivalent proportion of 5-caproamido-oxindole. There is thus obtained, in a similar manner, 5-caproamido-3-(5-nitro-2-furfurylidene)-oxindole, which when crystallised from butanol has M. P. 270° C.

The 5-caproamido-oxindole used as starting material may be obtained by interaction of 5-amino-oxindole and caproyl chloride in pyridine. It has M. P. 224-225° C. after crystallisation from ethanol.

Example 14

The process as described in Example 9 is repeated replacing the 5-n-valeramido-oxindole by an equivalent proportion of 5-caprylamido-oxindole. There is thus obtained, in a similar manner, 5-caprylamido-3-(5-nitro-2-furfurylidene)-oxindole, which when crystallised from ethanol has M. P. 222-223° C. The 5-caprylamido-oxindole used as starting material may be obtained by interaction of 5-amino-oxindole and caprylyl chloride in pyridine. It has M. P. 222-223° C. after crystallisation from ethanol.

Example 15

The process as described in Example 9 is repeated replacing the 5-n-valeramido-oxindole by an equivalent proportion of 5-capramido-oxindole. There is thus obtained, in a similar manner, 5-capramido-3-(5-nitro-2-furfurylidene)-oxindole, which when crystallised from ethanol has M. P. 225–226° C. The 5-capramido-oxindole used as starting material may be obtained by interaction of 5-amino-oxindole and capryl chloride in pyridine. It has M. P. 191–192° C. after crystallisation from ethanol.

*Example 16*

A mixture of 0.65 part of 5-(2-carboxypropionamido)-oxindole in 60 parts of methanol, 0.37 part of 5-nitro-2-furaldehyde and 0.1 part of sodium succinate is heated under reflux during 16 hours. The mixture is then cooled and filtered and the solid residue is dissolved in aqueous sodium carbonate solution. The solution is filtered and the filtrate is acidified with aqueous hydrochloric acid. There is thus obtained 5-(2-carboxypropionamido)-3-(5-nitro-2-furfurylidene)-oxindole, M. P. above 360° C.

The 5-(2-carboxypropionamido)-oxindole used as starting material may be obtained by adding a solution of 0.31 part of succinic anhydride in 30 parts of benzene to a solution of 0.45 part of 5-amino-oxindole in 20 parts of dioxan. The mixture is allowed to stand overnight at 18–23° C. and the solid is then collected and washed with petroleum ether (B. P. 60–80° C.). There is thus obtained 5-(2-carboxypropionamido)-oxindole.

*Example 17*

1.5 parts of 6-amino-oxindole and 20 parts of anhydrous formic acid are heated under reflux during 30 minutes. 1.5 parts of 5-nitro-2-furaldehyde are then added and the mixture is heated under reflux during a further 30 minutes. The mixture is cooled and filtered and the solid residue thus obtained is 6-formamido-3-(5-nitro-2-furfurylidene)-oxindole, M. P. above 360° C.

*Example 18*

A mixture of 18 parts of 6-acetamido-oxindole, 15 parts of 5-nitro-2-furaldehyde and 100 parts of acetic acid is heated under reflux during 2 hours. It is then cooled and filtered and the solid residue is washed with acetic acid and methanol. There is thus obtained 6-acetamido-3-(5-nitro-2-furfurylidene)-oxindole, M. P. above 330° C.

*Example 19*

A mixture of 0.25 part of 4-acetamido-oxindole, 0.2 part of 5-nitro-2-furaldehyde and 3 parts of acetic acid is heated under reflux during 30 minutes and is then cooled and filtered. The solid residue thus obtained is 4-acetamido-3-(5-nitro-2-furfurylidene)-oxindole, which when crystallised from dimethylformamide has M. P. above 260° C.

The 4-acetamido-oxindole used as starting material may be obtained by adding 24.2 parts of 35% aqueous hydrochloric acid in portions to a mixture of 4.2 parts of 2:6-dinitrophenylacetic acid, 10.22 parts of tin and 5 parts of ethanol. After the vigorous reaction subsides the mixture is heated under reflux during 30 minutes. It is then filtered and the filtrate is cooled and saturated with hydrogen sulphide. The mixture is filtered and the filtrate is evaporated to dryness under reduced pressure. The residue is dissolved in water and sodium bicarbonate is added. There is thus obtained 4-amino-oxindole, which after crystallisation from water has M. P. 180–182° C. 4-acetamido-oxindole is then prepared from 4-amino-oxindole by reaction with acetyl chloride in pyridine. It has M. P. 258–260° C. after crystallisation from ethanol.

*Example 20*

A mixture of 1 part of 5-methyl-oxindole, 1 part of 5-nitro-2-furaldehyde and 7 parts of acetic acid is heated under reflux during 2 hours and is then cooled and filtered. The solid residue thus obtained is 5-methyl-3-(5-nitro-2-furfurylidene)-oxindole, M. P. 236° C. with decomposition.

*Example 21*

3 parts of 5-hydroxy-oxindole, 5 parts of 5-nitro-2-furaldehyde and 25 parts of acetic acid, are reacted by the procedure described in Example 20. There is thus obtained, in a similar manner, 5-hydroxy-3-(5-nitro-2-furfurylidene)-oxindole, M. P. above 360° C.

*Example 22*

2 parts of 5-methoxy-oxindole, 1.5 parts of 5-nitro-2-furaldehyde and 20 parts of acetic acid are reacted by the procedure described in Example 20. There is thus obtained, in a similar manner, 5-methoxy-3-(5-nitro-2-furfurylidene)-oxindole, which when crystallised from 2-ethoxyethanol has M. P. 270° C. with decomposition.

*Example 23*

1 part of oxindole-6-carboxylic acid, 1 part of 5-nitro-2-furaldehyde and 20 parts of acetic acid are reacted by the procedure described in Example 20. There is thus obtained, in a similar manner, 3-(5-nitro-2-furfurylidene)-oxindole-6-carboxylic acid which after crystallisation from 2-ethoxyethanol has M. P. above 360° C.

*Example 24*

1.3 parts of 5:7-dibromo-oxindole, 0.63 part of 5-nitro-2-furaldehyde and 20 parts of acetic acid, are reacted by the procedure described in Example 20. There is thus obtained, in a similar manner, 5:7-dibromo-3-(5-nitro-2-furfurylidene)-oxindole, which after crystallisation from dimethylformamide has M. P. 308–310° C. with decomposition.

*Example 25*

A solution is prepared from 1 part of 3-(5-nitro-2-furfurylidene)-oxindole in 99 parts of polyethyleneglycol and the solution so obtained possesses antibacterial properties.

*Example 26*

An aqueous dispersion is prepared from 0.5 part of 3-(5-nitro-2-furfurylidene)-oxindole, 10 parts of polyoxyethylene sorbitan mono-oleate and 89.5 parts of water and the aqueous dispersion so obtained possesses antibacterial properties.

*Example 27*

A solution is prepared from 0.1 part of 3-(5-nitro-2-furfurylidene)-oxindole and 99.9 parts of castor oil and the oily solution so obtained possesses antibacterial properties.

*Example 28*

A solution is prepared from 0.5 part of 3-(5-nitro-2-furfurylidene)-oxindole, 24.5 parts of a condensation product obtained from octylcresol and 8–10 molecular proportions of ethylene oxide and 75 parts of polyethyleneglycol 400. The solution so obtained possesses antibacterial properties and it may be diluted with water to provide an aqueous solution possessing antibacterial detergent properties.

*Example 29*

An aqueous dispersion is prepared by adding 5 parts of 3-(5-nitro-2-furfurylidene)-oxindole to a mixture of 0.05 part of cetomacrogol 1000 B. P. C. (a condensation product of cetyl alcohol and 20–24 molecular proportions of ethylene oxide), 2 parts of ethyl cellulose, 2 parts of glycerol and 91 parts of water. The aqueous dispersion so obtained possesses antibacterial properties.

*Example 30*

An ointment is formulated by adding 1 part of 3-(5-nitro-2-furfurylidene)-oxindole to a mixture of 60 parts of polyethyleneglycol 400 and 39 parts of polyethyleneglycol 4000. There is thus obtained an ointment possessing antibacterial properties.

Example 31

A paste is formulated in the known manner by incorporating 1 part of 3-(5-nitro-2-furfurylidene)-oxindole into a mixture of 78 parts of castor oil, 10 parts of white beeswax and 3 parts of cetostearyl alcohol and then thickening the product with 8 parts of zinc oxide. There is thus obtained a paste, possessing antibacterial properties, which may be used for treatment of the skin.

Example 32

A cream is formulated in the known manner by incorporating 0.5 part of 3-(5-nitro-2-furfurylidene)-oxindole in a mixture of 20 parts of castor oil, 9 parts of cetostearyl alcohol, 2 parts of cetomacrogol 1000 B. P. C. and 68.5 parts of water. There is thus obtained an antiseptic cream which may be used for treatment of the skin.

Example 33

A dusting powder is prepared by adding 0.05 part of 3-(5-nitro-2-furfurylidene)-oxindole to a mixture of 10 parts of starch, 10 parts of boric acid and 80 parts of talc. There is thus obtained a dusting powder possessing antibacterial properties which may be used for treatment of the skin.

Example 34

A dusting powder is prepared by adding 0.1 part of 3-(5-nitro-2-furfurylidene)-oxindole to a mixture of 74.9 parts of starch and 25 parts of zinc oxide. There is thus obtained a dusting powder possessing antibacterial properties which may be used for treatment of the skin.

What I claim is:

1. 3-(5-nitro-2-furfurylidene)-oxindole.
2. Indole derivatives which are compounds of the formula:

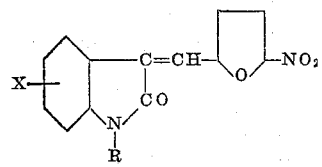

wherein R stands for hydrogen, and X is selected from the group consisting of hydrogen, halogen, nitro, aliphatic acylamino containing up to nine carbon atoms, monocyclic aryl acyl amino, lower alkyl, hydroxy, lower alkoxy and carboxy radicals.

3. An antimicrobial composition comprising as the active ingredient, at least one indole derivative of the formula stated in claim 2, and an inert non-toxic carrier for said ingredient.
4. The composition of claim 3 comprising a solution of said ingredient in polyethylene glycol.
5. The composition of claim 3 comprising an aqueous dispersion of said active ingredient and polyoxyethylene sorbitan mono-oleate as the dispersing agent.
6. The composition of claim 3 comprising an aqueous dispersion of said active ingredient including a member of the group consisting of glycerol, ethyl cellulose and condensation products of fatty alcohols with ethylene oxide.
7. The composition of claim 3 comprising an oily solution of said active ingredient.
8. The composition of claim 3 in the form of a cream.
9. The composition of claim 3 comprising the active ingredient in an inert pulverulent carrier therefor.
10. A composition as claimed in claim 3 wherein the active ingredient is 3-(5-nitro-2-furfurylidene)-oxindole.

References Cited in the file of this patent

UNITED STATES PATENTS

| 2,622,980 | Copeland | Dec. 23, 1952 |
| 2,726,241 | Gever | Dec. 6, 1955 |
| 2,746,960 | Gever | May 22, 1956 |

OTHER REFERENCES

Chemical Abstracts, vol. 45, p. 5147(e), 1951 [Abstract of Stanck et al., Chem. Listy, vol. 40, 173–7 (1946)].

Chemical Abstracts, vol. 49, p. 11460 (1955), (Abstract of Sasaki Pharm. Bull. (Japan) 2, pp. 99–104 (1954)).

Dunlop et al.: "The Furans," ASC Monograph Series 119 Reinhold Publishing Corporation (1953), p. 164.